(12) United States Patent
Alsheuski

(10) Patent No.: US 10,146,051 B2
(45) Date of Patent: Dec. 4, 2018

(54) PRECISION ADJUSTMENT OF PROJECTED DIGITAL INFORMATION WITHIN A DAYLIGHT OPTICAL DEVICE

(71) Applicant: JSC Yukon Advanced Optics Worldwide, Vilneus (LT)

(72) Inventor: Aliaksandr Alsheuski, Vilneus (LT)

(73) Assignee: JSC Yukon Advanced Optics Worldwide, Vilneus (LT)

( * ) Notice: Subject to any disclaimer, the term of this patent is extended or adjusted under 35 U.S.C. 154(b) by 28 days.

(21) Appl. No.: 14/839,814

(22) Filed: Aug. 28, 2015

(65) Prior Publication Data
US 2017/0059860 A1  Mar. 2, 2017

(51) Int. Cl.
*G02B 23/04* (2006.01)
*G02B 27/01* (2006.01)
*G02B 23/10* (2006.01)
*F41G 1/38* (2006.01)

(52) U.S. Cl.
CPC ........... *G02B 27/0101* (2013.01); *F41G 1/38* (2013.01); *G02B 23/04* (2013.01); *G02B 23/10* (2013.01); *G02B 27/0189* (2013.01); *G02B 27/0172* (2013.01); *G02B 27/0179* (2013.01); *G02B 2027/0127* (2013.01); *G02B 2027/0141* (2013.01)

(58) Field of Classification Search
CPC ..... F41G 3/06; F41G 3/08; F41G 5/14; F41G 1/38
See application file for complete search history.

(56) References Cited

U.S. PATENT DOCUMENTS

| 6,304,395 | B1 * | 10/2001 | Ito | G02B 5/04 |
| | | | | 359/584 |
| 2012/0000979 | A1 * | 1/2012 | Horvath | F41G 1/38 |
| | | | | 235/407 |
| 2012/0097741 | A1 * | 4/2012 | Karcher | F41G 1/38 |
| | | | | 235/404 |
| 2013/0199074 | A1 * | 8/2013 | Paterson | F41G 1/38 |
| | | | | 42/122 |

(Continued)

OTHER PUBLICATIONS

International Search Report and Written Opinion issued International Application No. PCT/IB2016/055151, dated Dec. 6, 2016.

*Primary Examiner* — Olga Merkoulova
(74) *Attorney, Agent, or Firm* — Fish & Richardson P.C.

(57) ABSTRACT

An optical device includes a digital visual data system, a forward optical assembly, and an elevation manual adjustment and a windage manual adjustment. The elevation manual adjustment and the windage manual adjustment are configured to adjust a position of a movable optical assembly containing an optical merging assembly independently moveable in relation to the forward optical assembly. The optical merging assembly includes a first wedge-shaped component receiving optical data from the forward optical assembly and a second wedge-shaped component adjacent to the first wedge-shaped component that receives and transmits the optical data from the first wedge-shaped component through the second wedge-shaped component toward an eyepiece assembly and that reflects digital visual data from a micro-display toward the eyepiece assembly to present a merged data view when viewed through the eyepiece assembly.

20 Claims, 9 Drawing Sheets

(56) References Cited

U.S. PATENT DOCUMENTS

2013/0279013 A1* 10/2013 Edwards ............ G02B 27/0189
                                                    359/630
2014/0375542 A1* 12/2014 Robbins ............. G02B 27/0176
                                                    345/156

* cited by examiner

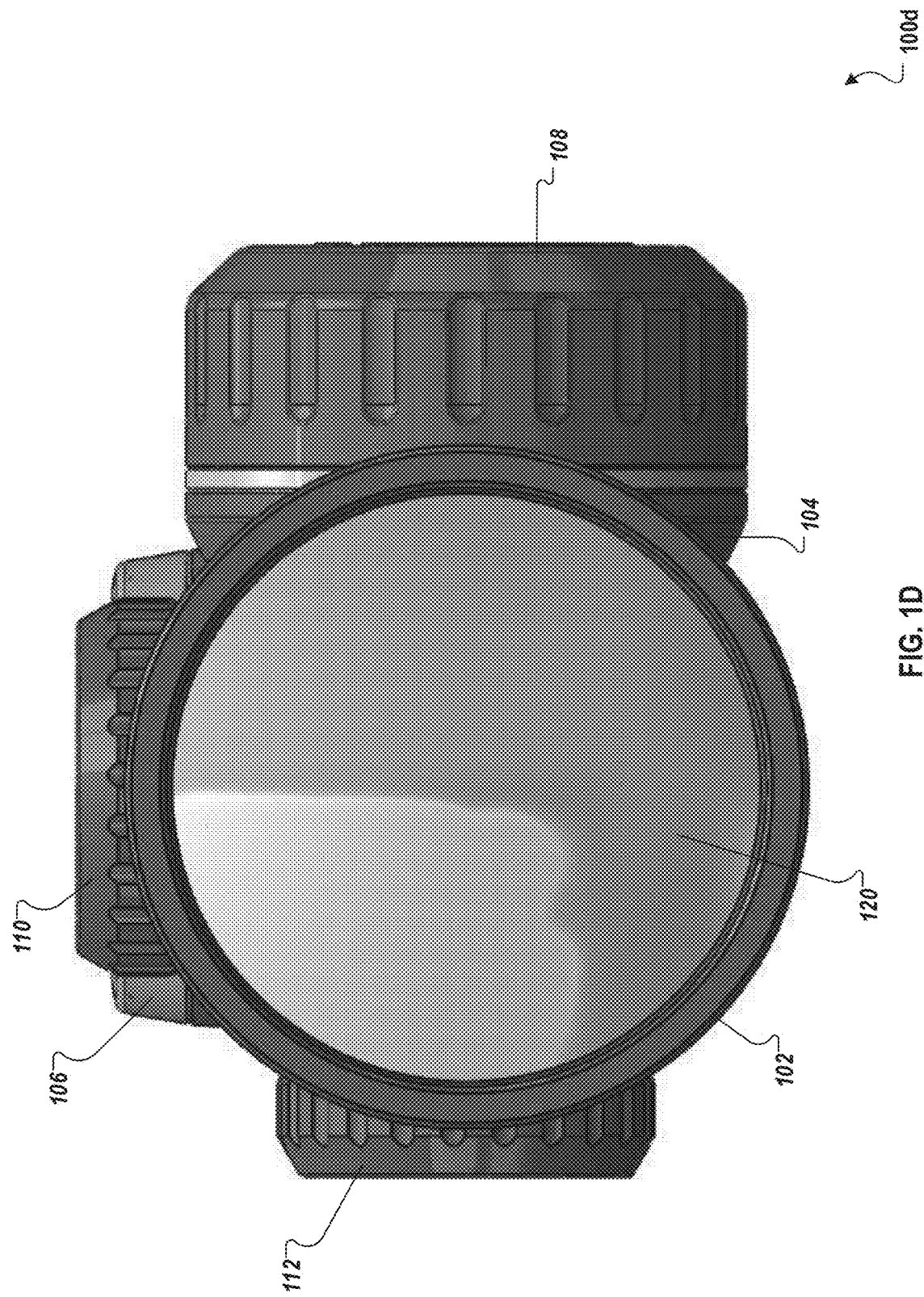

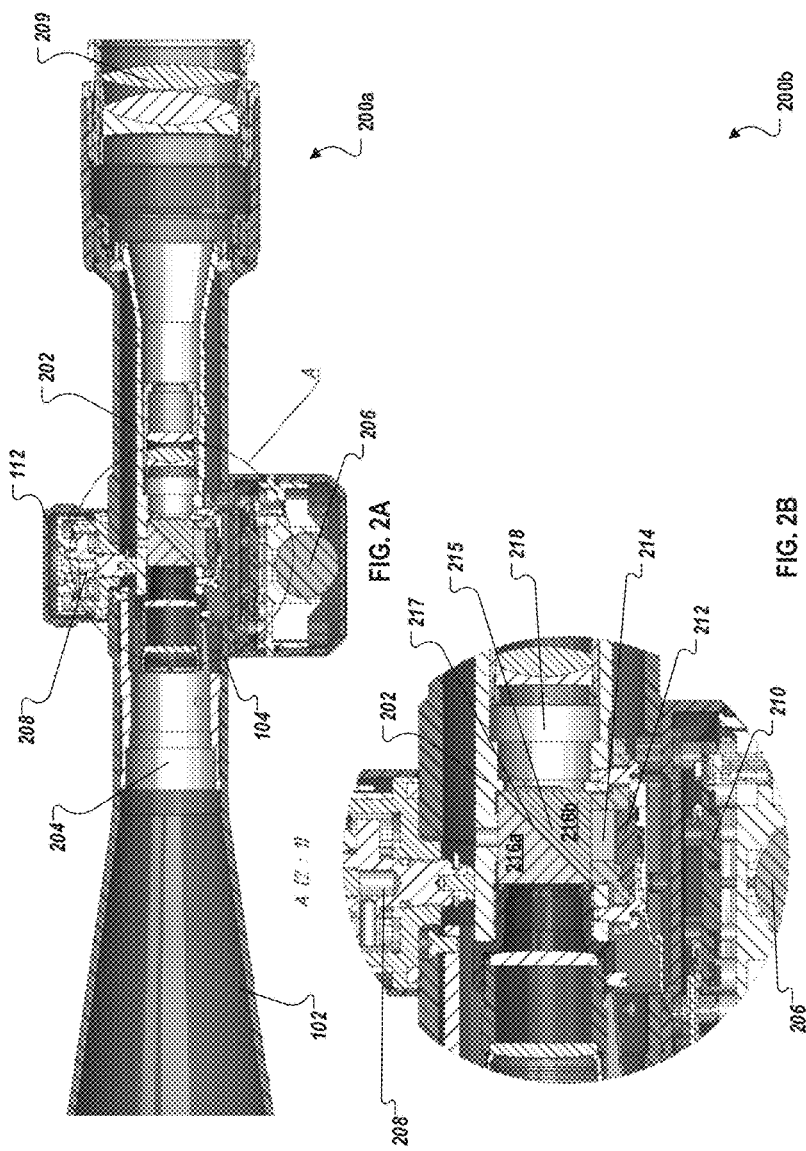

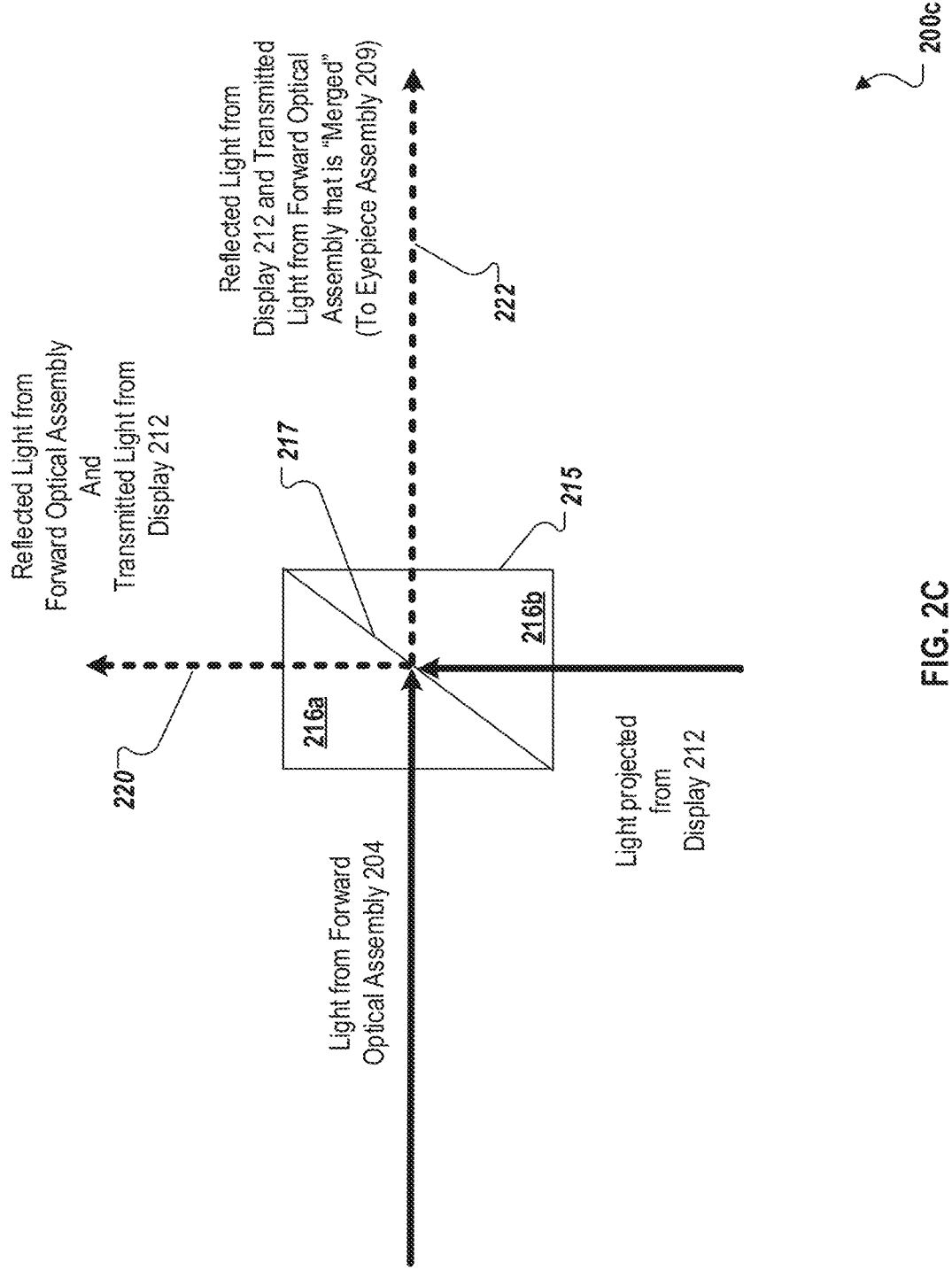

PRECISION ADJUSTMENT OF PROJECTED DIGITAL INFORMATION WITHIN A DAYLIGHT OPTICAL DEVICE

BACKGROUND

Currently when using an optical device (e.g., a firearm scope, spotting scope, binocular, telescope, etc.) with projected digital information (e.g., reticles, windage/elevation data, temperature/humidity/atmospheric pressure data, etc.), fine adjustment of the projected digital information (e.g., a digital reticle for aiming of a firearm scope) is typically constrained by the pixel size of a display used to generate the digital information projected on optical components (e.g., lenses, eyepiece, etc.) of the optical device. This lack of precision can, for example, constrain the overall usefulness of the optical device for various tasks, decrease or prevent an optical device operator's gathering of useful data (e.g., long range target acquisition/sighting, surveillance, sporting events, nature watching, etc.), fully assessing a tactical situation, and/or performing some other desired task.

SUMMARY

The present disclosure describes providing precision adjustment of projected digital information within a daylight optical device.

In an implementation, an optical device includes a digital visual data system, a forward optical assembly, and an elevation manual adjustment and a windage manual adjustment. The elevation manual adjustment and the windage manual adjustment are configured to adjust a position of a movable optical assembly containing an optical merging assembly independently moveable in relation to the forward optical assembly. The optical merging assembly includes a first wedge-shaped component receiving optical data from the forward optical assembly and a second wedge-shaped component adjacent to the first wedge-shaped component that receives and transmits the optical data from the first wedge-shaped component through the second wedge-shaped component toward an eyepiece assembly and that reflects digital visual data from a micro-display toward the eyepiece assembly to present a merged data view when viewed through the eyepiece assembly.

Particularly, in the foregoing implementation, an optical device, comprises: a digital visual data system; a forward optical assembly; an elevation manual adjustment and a windage manual adjustment configured to adjust a position of a movable optical assembly, the movable optical assembly containing an optical merging assembly moveable in relation to the forward optical assembly, the optical merging assembly comprising: a first wedge-shaped component receiving optical data from the forward optical assembly; and a second wedge-shaped component adjacent to the first wedge-shaped component, the second wedge-shaped component receiving and transmitting the optical data from the first wedge-shaped component toward an eyepiece assembly and reflecting digital visual data from a micro-display toward the eyepiece assembly to present a merged data view when viewed through the eyepiece assembly.

The foregoing and other implementations can each optionally include one or more of the following features, alone or in combination:

A first aspect, combinable with the implementation, wherein the position of the digital visual data on the micro-display is adjustable.

A second aspect, combinable with the implementation, wherein the movable optical assembly is adjustable using one or more of the elevation manual adjustment and the windage manual adjustment independently of a positional adjustment of the digital visual data on the micro-display.

A third aspect, combinable with the implementation, wherein each wedge-shaped optical component is configured to allow light to travel in a single direction through the wedge-shaped optical component.

A fourth aspect, combinable with the implementation, comprising a two-way reflective coating between the first wedge-shaped component and the second wedge-shaped component, the two-way reflective coating configured to reflect visual data in the direction of the eyepiece assembly.

A fifth aspect, combinable with the implementation, comprising a lens configured between the micro-display and the second wedge-shaped component.

In an implementation, a method of use can include: activating a digital visual data system associated with an optical device; receiving optical data from a forward optical assembly of the optical device at an optical merging assembly mechanically coupled to a movable optical assembly independently movable in relation to the forward optical assembly; receiving digital visual data at the optical merging assembly from the digital visual data system; transmitting merged received optical data and digital visual data to an eyepiece assembly for viewing; and manually adjusting a movable optical assembly containing the optical merging assembly in relation to the received optical data from the forward optical assembly.

The foregoing and other implementations can each optionally include one or more of the following features, alone or in combination:

A first aspect, combinable with the implementation, wherein the optical merging assembly comprises a plurality of wedge-shaped optical components.

A second aspect, combinable with the implementation, wherein received sensor data is processed for one or more sensors associated with the digital visual data system.

A third aspect, combinable with the implementation, wherein processing includes formatting, sizing, scaling, position determination, contrast determination, and brightness determination.

A fourth aspect, combinable with the implementation, wherein the digital visual data is generated on a micro display coupled with the optical merging assembly.

A fifth aspect, combinable with the implementation, comprising locking the manual adjustment of the movable optical assembly.

A sixth aspect, combinable with the implementation, comprising manipulating one or more aspects of the digital visual data in relation to the locked movable optical assembly.

Other implementations of this aspect can include corresponding computer systems, apparatuses, and computer programs recorded on one or more computer-readable media/storage devices, each configured to perform actions of methods associated with the described precision adjustment of projected digital information within a daylight optical device. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

For example, one implementation can include a non-transitory, computer-readable medium storing computer-readable instructions, the instructions executable by a computer and configured to: activate a digital visual data system associated with an optical device; and transmit digital visual data from the digital visual system to an optical merging assembly mechanically coupled to a movable optical assembly that is independently movable in relation to a forward optical assembly, the digital visual data reflected by the optical merging assembly to be received at an eyepiece assembly along with optical data received by the forward optical assembly and transmitted through the optical merging assembly.

The foregoing and other implementations can each optionally include one or more of the following features, alone or in combination:

A first aspect, combinable with the implementation, wherein the optical merging assembly comprises a plurality of wedge-shaped optical components.

A second aspect, combinable with the implementation, comprising processing received sensor data for one or more sensors associated with the digital visual data system.

A third aspect, combinable with the implementation, wherein processing includes formatting, sizing, scaling, position determination, contrast determination, and brightness determination.

A fourth aspect, combinable with the implementation, wherein the digital visual data is generated on a micro display coupled with the optical merging assembly.

A fifth aspect, combinable with the implementation, comprising locking a manual adjustment of the movable optical assembly.

A sixth aspect, combinable with the implementation, comprising manipulating one or more aspects of the digital visual data in relation to the locked movable optical assembly.

The subject matter described in this specification can be implemented in particular implementations so as to realize one or more of the following advantages. First, the ability to project digital information (e.g., reticles, windage/elevation data, temperature/humidity/atmospheric pressure data, etc.) into a daylight optical device provides data to enhance usability of the optical device compared to the same optical device without the projected digital information. Second, manual windage and elevation adjustments can be used to move projected digital information as opposed to digitally moving the projected digital information; allowing for fine adjustment of the projected digital information without the limitation of minimum pixel-sized movement increments. This manual movement can be very important, for example, in long-range applications such as firearm scopes, target sighting, etc. Third, the optical device also allows digital movement (i.e., without moving the optical assembly) of the projected digital information to enhance usability of the optical device. For example, the optical device could be coupled with an optical sensor, inclinometer, accelerometer, and gyroscope to allow the optical device (or linked device (s)) to calculate the direction, velocity, etc. of a moving target and for a projected digital reticle to indicate an offset "lead" for a target to allow the moving target to be engaged and eliminated. Similarly, sensors such as windage, atmospheric pressure, temperature, etc. can be used to calculate an offset for a projectile against a current target centered in an optical reticle built into the optical components of the optical device (e.g., a firearm scope reticle). Fourth, the optical device can provide various controls for power, brightness, contrast, projected information selection and movement, etc. to enhance usability in varying light conditions and usage situations. Fifth, the optical device can be linked (e.g., hardwired or wireless) to computer systems allowing firmware and other software upgrades, addition/deletion of reticles, access to varying sensor packages for use by the optical device software, etc. Sixth, a built-in camera can be used with an optical splitter to permit real-time monitoring/recording of what is seen/heard through the optical device. This functionality can be useful for training purposes (e.g., law enforcement and military) and to keep records of optical device use. As an example, a mobile device (e.g., a smartphone or table) can be linked to the optical device and provide monitoring, recording, configuration, and/or other functionality consistent with this disclosure. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1D is a front view of the daylight optical device of FIG. 1A providing precision adjustment of projected digital information, according to an implementation.

FIG. 2A is a top cutaway view of the daylight optical device of FIG. 1A providing precision adjustment of projected digital information, according to an implementation.

FIG. 2B is focused cutaway view of the identified region of FIG. 3A of digital-to-optical projection components and mechanical interfaces for adjustment, according to an implementation.

FIG. 2C is a block diagram illustrating light transmission in a typical optical merging assembly, according to an implementation.

Like reference numbers and designations in the various drawings indicate like elements.

DETAILED DESCRIPTION

Figure 1A:
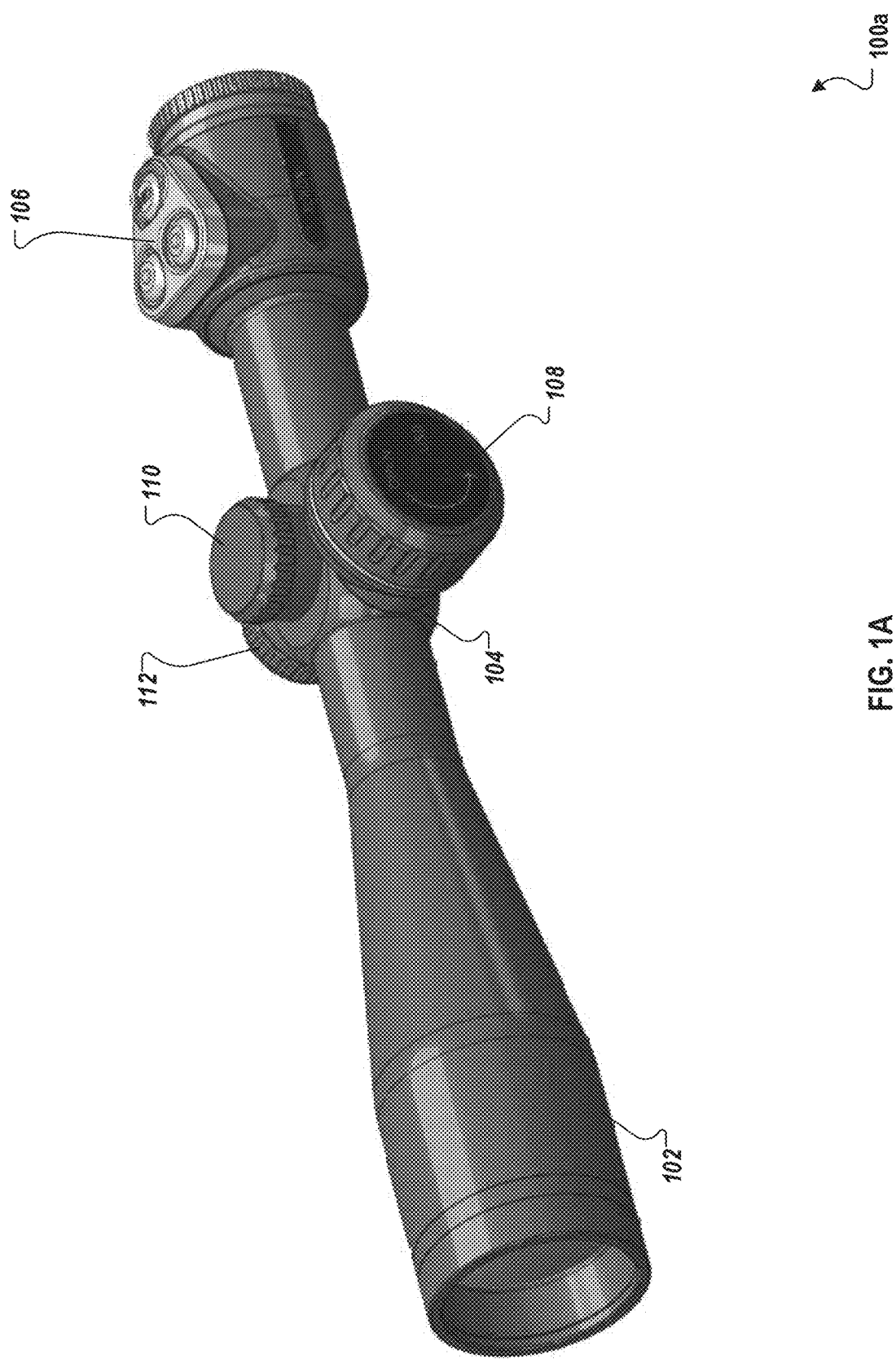
FIG. 1A is a perspective view of a daylight optical device providing precision adjustment of projected digital information, according to an implementation.

The following detailed description is presented to enable any person skilled in the art to make, use, and/or practice the disclosed subject matter and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations but is to be accorded the widest scope consistent with the principles and features disclosed herein.

Currently when using an optical device (e.g., a firearm scope, spotting scope, binocular, telescope, etc.) with projected digital information (e.g., reticles, windage/elevation data, temperature/humidity/atmospheric pressure data, etc.), fine adjustment of the projected digital information (e.g., a digital reticle for aiming of a firearm scope) is typically constrained by the pixel size of a display used to generate the digital information projected on optical components (e.g., lenses, eyepiece, etc.) of the optical device. This lack of precision can, for example, constrain the overall usefulness of the optical device for various tasks, decrease or prevent an optical device operator's gathering of useful data (e.g., long range target acquisition/sighting, surveillance, sporting events, nature watching, etc.), fully assessing a tactical situation, and/or performing some other desired task. The disclosure describes an optical device with the ability to project digital information (e.g., reticles, windage/elevation data, temperature/humidity/atmospheric pressure data, etc.) into a daylight optical device provides data to enhance usability of the optical device compared to the same optical device without the projected digital information.

Manual windage and elevation adjustments are typically used to move projected digital information as opposed to digitally moving the projected digital information within the optical device; allowing for fine adjustment of the projected digital information without the limitation of minimum pixel-sized movement increments due to the display used to generate the projected digital information. This manual movement can be very important, for example, in long-range applications such as firearm scopes, target sighting, etc.

In some implementations, the described optical device also allows digital movement (i.e., without moving the optical assembly) of the projected digital information to enhance usability of the optical device. For example, the optical device could be coupled with an optical sensor, inclinometer, accelerometer, and gyroscope to allow the optical device (or linked device(s)) to calculate the direction, velocity, etc. of a moving target and for a projected digital reticle to indicate an offset "lead" for a target to allow the moving target to be engaged and eliminated. Similarly, sensors such as windage, atmospheric pressure, temperature, etc. can be used to calculate an offset for a projectile against a current target centered in an optical reticle built into the optical components of the optical device (e.g., a firearm scope reticle).

In typical implementations, the described optical device provides various controls for power, brightness, contrast, projected digital information selection and movement, etc. The various controls can be used to enhance usability in varying light conditions and usage situations.

In some implementations, the optical device can also be linked (e.g., hardwired or wireless) to computer systems allowing firmware and other software upgrades, addition/deletion of reticles, access to varying sensor packages for use by the optical device software, etc. This ability provides fast and useful upgrades depending upon a planned use of the optical device. For example, a long-shooting application may wish to load narrower or military standard reticles as opposed to a bird watcher who may only need simplistic dots (e.g., a "red dot"), 'T'/'X'-type reticles, or other type of aiming indicator. Other users may wish to turn ON/OFF all or some of the projected digital information (e.g., to just use the optical reticle built into the optical device to provide an unobstructed view of a target).

In implementations with a projected digital reticle, reticle types/patterns can be pre-programmed and/or uploaded into a memory for use through a data, network, and/or other type of connection. Reticles can also be aligned ("zeroed") with a reticle integrated into the optical components of the optical device to allow for even greater versatility (e.g., using an adjustment method such as a multi-function switch, touch screen, external application on a mobile device, etc.) to move the projected digital reticle.

In some implementations, a built-in camera can be used with an optical splitter to permit real-time monitoring/recording of what is seen/heard through the optical device. This functionality can be useful for training purposes (e.g., law enforcement and military) and to keep records of optical device use. As an example, a mobile device (e.g., a smartphone or table) can be linked to the optical device and provide monitoring, recording, configuration, and/or other functionality consistent with this disclosure.

At a high level, what is described is a system and method for providing precision adjustment of projected digital information with respect to an optical device. The provided illustrations of a particular optical device providing the described functionality is provide to assist with understanding of the described concepts and functionality and is not meant to limit the described subject matter. Those of ordinary skill in the art will appreciate that the described system, method, and/or functionality can be applied to optical devices including, but not limited to, firearm scopes, spotting scopes, telescopes, binoculars, monocular, digital cameras, and other optical devices. While typically the described system, method, and/or functionality is integrated directly into the hardware/software of an optical device, in some implementations, a specific "add-on"/external system implementation can be used in conjunction with an existing optical device (with appropriate adaptors as understood by those of ordinary skill in the art) to provide at least some of the described functionality (e.g., provided as a "retrofit" to an existing optical device).

FIG. 1A is a perspective view 100a of a daylight optical device providing precision adjustment of projected digital information, according to an implementation. While optical device 102 is illustrated in the form factor of a firearm scope, other implementations of the optical device are not limited to the illustrated form, locations/orientation of various components, and the like. Illustrated optical device 102 includes a projection component 104, multi-function adjustment assembly 106, interface/battery assembly 108, elevation manual adjustment 110, and windage manual adjustment 112.

The projection component 104 contains various components (described in more detail below) to permit superimposing digital information with optical data received from optical components of the optical device. In typical implementations, the projection components are coupled with a movable assembly (e.g., the inner "tube" of a standard optical rifle scope) that permit the digital information producing components to be moved manually with the movable assembly in relation to optical data received from optical components of the optical device 102 The fact that the projection components are coupled with the movable assembly, often containing an optical reticle or other aiming-type indicator, digital information can be moved in relation to the optical reticle or other aiming-type indicator (e.g., moving a digital reticle against an integrated optical reticle, etc.).

The multi-function adjustment assembly 106 provides various functions with respect to the projection of digital information onto optical components of the optical device 102. While illustrated in a specific configuration (three "buttons"), in other implementations, some or all functionality described below with respect to the multi-function adjustment assembly 106 can be provided by, for example, a different multi-function-type assembly, a touch screen, an external application executing on a mobile computing device, etc. In typical implementations, the multi-function adjustment assembly 106 can provide functionality to turn the projection components of the optical device 102, reticles, and/or any other elements of available projected digital information ON/OFF. The multi-function adjustment assembly 106 can also be used to provide settings for power levels/saving modes, brightness, contrast, projected digital information selection and movement, audio/video recording or playback functionality, connection options (e.g., WIFI, BLUETOOTH, etc.), and other settings/functions consistent with this disclosure. The various controls can be used to enhance usability of the optical device 102 in varying light conditions and usage situations.

As an example, a user of the optical device 102 can use the multi-function adjustment assembly 106 to turn off all projected digital information other than windage/elevation or a simple digital reticle. The user could also just switch OFF the projected digital information to allow the optical device to be used as a standard optical device.

As another example, a user of the optical device 102 can use the multi-function adjustment assembly 106 to on-the-fly make a projected digital reticle a different size ("zoom") or color, change displayed digital information type(s), etc. This could be done by the user or a partner while the user is viewing a target through the optical device 102 depending upon need/circumstances.

In typical implementations, the interface/battery assembly 108 provides an interface to a data port (not illustrated) (e.g., USB, FIREWIRE, etc.) used for data transfer/recovery, battery charging, etc. with respect to the optical device 102. In some instances, the interface/battery assembly 108 can rotate to open/close the described data port to provide protection from water, dust, dirt, etc. encroachment. In some instances, the interface/battery assembly 108 can also unscrew (e.g., a "cap" that covers internal components) to provide access to a battery (e.g., rechargeable/non-rechargeable of any suitable type—such as a CR123, button call form factor, etc.) and to the projection system components for maintenance, etc.

In typical implementations, the elevation manual adjustment 110 and windage manual adjustment 112 provide commonly understood elevation/windage adjustments for the optical device 102. In some implementations, however, other functions can also be assigned to the elevation manual adjustment 110 and windage manual adjustment 112 through the use of additional components, sensors, etc. as would be understood to one of ordinary skill in the art. For example, the elevation manual adjustment 110 could be monitored by an onboard computing system for adjustment frequency, amounts, etc. and provide recommended settings to a user based on normal use or display a projected digital value to a user when using the elevation manual adjustment 110 to allow easy visualization of the elevation adjustment being made. As will be appreciated by those of ordinary skill in the art, the elevation manual adjustment 110 and windage manual adjustment 112 in the described configuration could be used for a multitude of possible functions consistent with this disclosure. Functions consistent with this disclosure are considered to be within the scope of this disclosure.

Figure 1B:
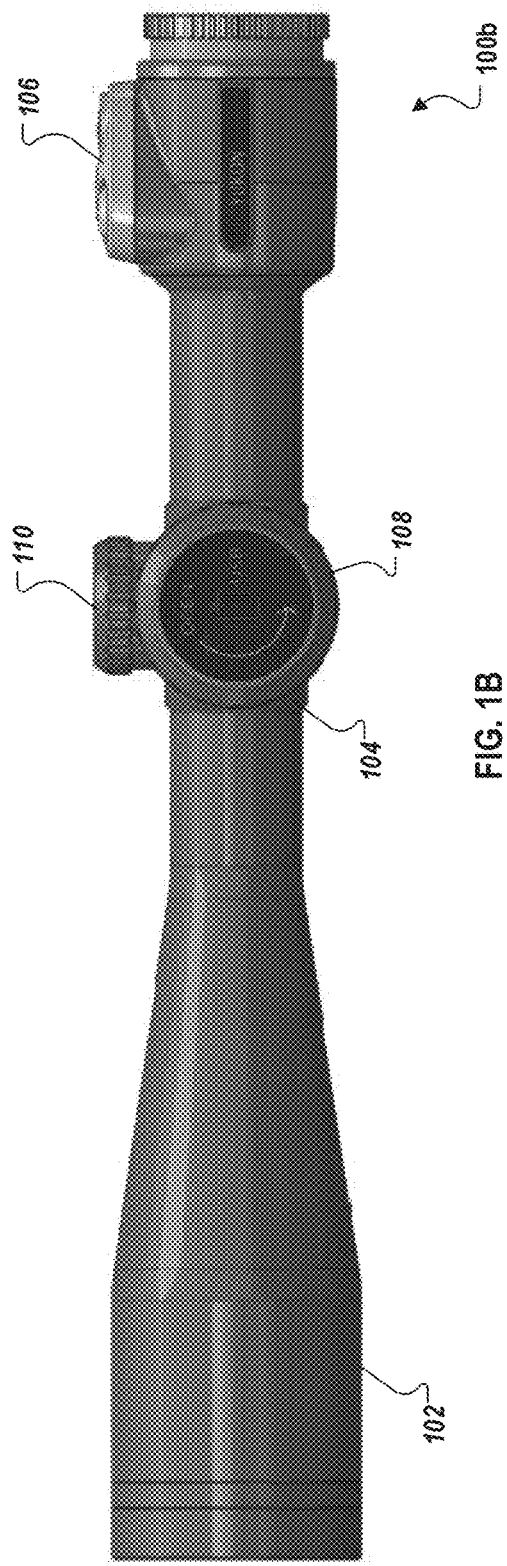
FIG. 1B is a left-side view of the daylight optical device of FIG. 1A providing precision adjustment of projected digital information, according to an implementation.

FIG. 1B is a left-side view 100b of the daylight optical device of FIG. 1A providing precision adjustment of projected digital information, according to an implementation. As illustrated for understanding and not to be limiting, the interface/battery assembly 108 "cap" indicates functionality to "OPEN" access to a USB port by turning the assembly counterclockwise (e.g., either revealing a port covered when the "cap" is in a closed position or by removing the cap to permit access to a covered USB port).

Figure 1C:
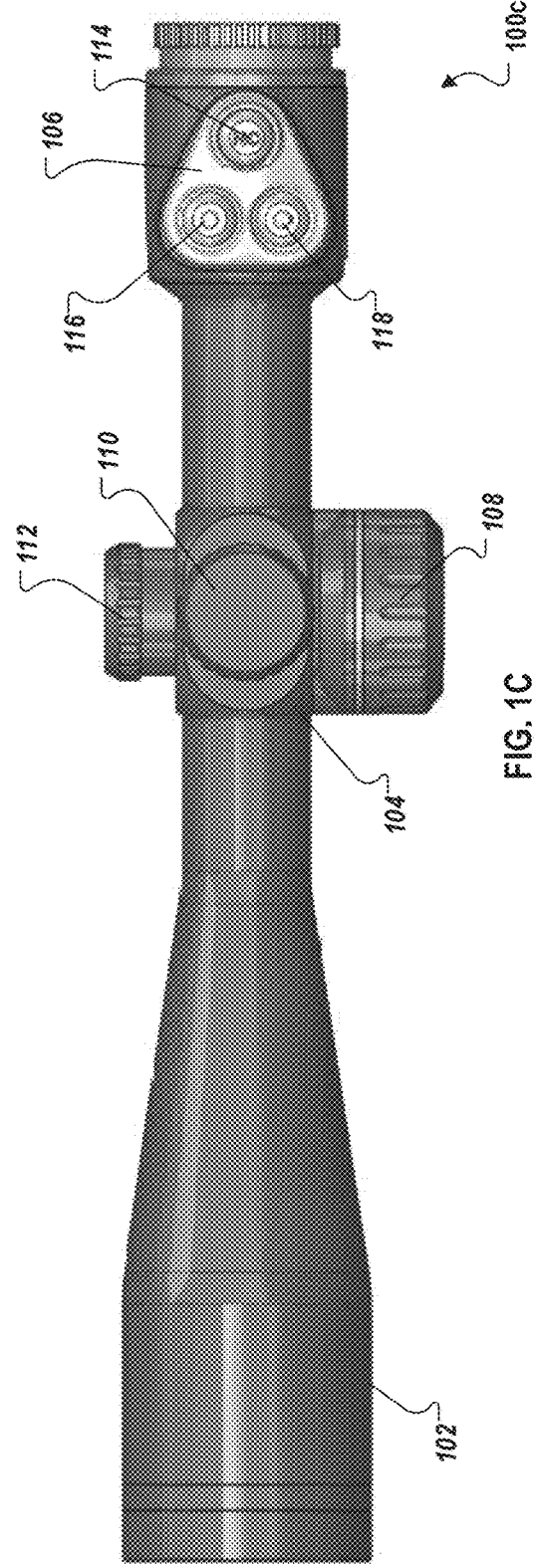
FIG. 1C is a top view of the daylight optical device of FIG. 1A providing precision adjustment of projected digital information, according to an implementation.

FIG. 1C is a top view 100c of the daylight optical device of FIG. 1A providing precision adjustment of projected digital information, according to an implementation. As illustrated for understanding and not to be limiting, the multi-function adjustment assembly 106 has three buttons including an "ON" (e.g., power ON/OFF) button 114 and two separate buttons 116 and 118 to provide other assigned functionalities (e.g., as describe above and other possible functions consistent with this disclosure).

FIG. 1D is a front view 100d of the daylight optical device of FIG. 1A providing precision adjustment of projected digital information, according to an implementation. The front view 100d also illustrates the front optical lens 120 of the optical device 102.

Figure 1E:
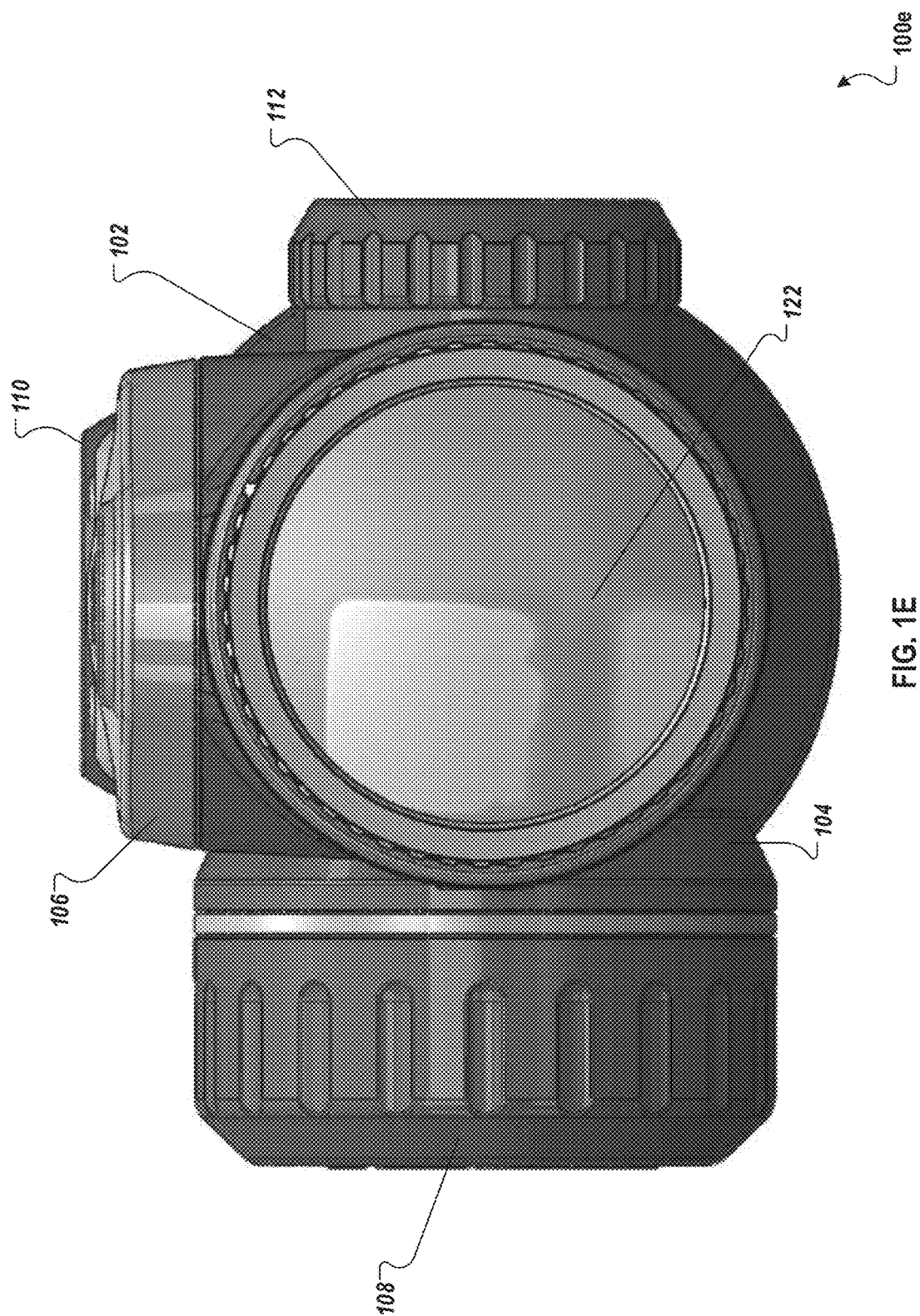
FIG. 1E is a rear view of the daylight optical device of FIG. 1A providing precision adjustment of projected digital information, according to an implementation.

FIG. 1E is a rear view 100e of the daylight optical device of FIG. 1A providing precision adjustment of projected digital information, according to an implementation. The rear view 100e also illustrates the rear optical lens (e.g., as part of an eyepiece) 122 of the optical device 102.

FIG. 2A is a top cutaway view 200a of the daylight optical device of FIG. 1A providing precision adjustment of projected digital information, according to an implementation. Note that elements of circled region A are further described in FIG. 2B. As illustrated, the optical device 102 includes a movable optical assembly 202, forward optical assembly 204, battery 206 (as described above), and windage manual adjustment mechanism 208 (as part of windage manual adjustment 112). Note that while not illustrated, the mechanism associated with the elevation manual adjustment 110 can, in some implementations, be similar in operation to that of the windage manual adjustment mechanism 208.

Movable optical assembly 202 contains both optical elements typically found in an optical device (e.g., a firearm scope) and elements of the projection component 104 (further described in FIG. 2B). The movable optical assembly 202 permits digital information to be projected into the optical path of the optical device 102 to allow the digital information to be superimposed over the optical information received from the forward optical assembly 204. In typical implementations, the forward optical assembly 204 contains one or more optical lenses used to gather, focus, and direct light into the optical axis of the optical device 102 (e.g., through the movable optical assembly 202 and to an eyepiece assembly (e.g., eyepiece assembly 209) for viewing.

Movable optical assembly 202 can be adjusted within the interior of the optical device 102, for example, for elevation and windage, using elevation manual adjustment 110 and windage manual adjustment 112 (and associated internal components of each). As the projection components are coupled with and fixed in relation to the optical elements of the movable optical assembly, manual adjustment of a default/non-digital reticle can be performed using as fine as possible gradations as the elevation manual adjustment 110 and windage manual adjustment 112 provide to the user. As such, any projected digital information can also be adjusted in relation to a target with the default/non-digital reticle using purely mechanical means. This mechanical movement eliminates minimum pixel-sized gradations if digital information is moved on a display (such as an LCD display) and this movement is projected into the optical path of the optical device 102.

In some implementations, digital information projected into the optical path can be independently moved in relation to mechanical movement of the movable optical assembly 202. For example, if a user would like to use a digital reticle to mark a different target or set an offset in relation to the default/optical reticle, the projected digital reticle could be independently moved in relation to the default/optical reticle. As another example, digital information could be moved to different areas of an optical path in relation to the default optical reticle to prevent obstruction of areas of an optical image. As described above, projected digital information could also have color, size, orientation, font, etc. varied depending on use preference and projected to superimpose any portion of an optical image if desired. In some implementations, presets may limit where digital information can be projected and options relating to the digital information (e.g., position, color, size, etc.).

Turning now to FIG. 2B, FIG. 2B is a focused cutaway view 200b of the identified region of FIG. 2A of digital-to-optical projection components and mechanical interfaces for adjustment, according to an implementation. Elements of the movable optical assembly include an electronic control board (ECB) 210, display 212, lens 214, optical merging assembly 215, and rear optical assembly 218.

In typical implementations, ECB 210 contains a computer processor, memory, software, etc. to perform the above-described projection of digital information and other functionality. In some instances, some or all of the described computational functionality can be associated with the multi-function adjustment assembly 106 (not illustrated in FIG. 2A or 2B). In still other instances, some or all described computational functionality can be associated with an external computing system (e.g., a mobile computing device, etc.) connected using, for example, a hard wire link or wireless communication protocols.

The ECB 210 is coupled (e.g., using a computer data bus connection) to display 212 for projecting digital information. Display 212 can, in some implementations, be an LCD, organic light emitting diode (OLED), active matrix OLED (AMOLED), or other suitable display. Display 212 is coupled to lens 214 which directs displayed images into optical merging assembly 215. In various implementations, the lens can either focus larger displayed images to a smaller "footprint" (e.g., where the micro display is large in relation to the size of an adjacent component of the optical merging assembly 215) or expand smaller displayed images (e.g., where the micro display is small in relation to the size of an adjacent component of the optical merging assembly 215). In typical implementations, display 212 can be considered a "micro"-type display.

Referring to FIG. 2C, FIG. 2C is a block diagram 200c illustrating light transmission in a typical optical merging assembly 215, according to an implementation. Optical merging assembly 215 is a beam-splitter-type assembly typically made up of two prismatic wedge-shaped components (216a & 216b) of a glass, crystal, ceramic, metal, and/or other materials (including combinations of materials) transparent to light. The prismatic wedges are typically adhered together (e.g., using a polyester, epoxy, or urethane-base adhesive) where the thickness of the adhesive layer causes a percentage (e.g., 50%) of the light incident through a wedge to be reflected while the other percentage is transmitted through. As illustrated, wedge 216a receives optical data from the forward optical assembly 204 and wedge 216b is coupled to and receives digital visual data from the display 212.

As illustrated, light 220 is made up of both reflected light (e.g., by the inner surface 217, adhesive, etc.) from the incident light received from the forward optical assembly 204 and some transmitted light from incident light provided by display 212. In some implementations, light 220 can be discarded and not used. In other implementations, the light 220 can be received by a camera (not illustrated) for monitoring/recording purposes. Similarly, light 222 is made up of both reflected light from incident light provided by the display 212 and transmitted through light from the incident light received from the forward optical assembly 204. Light 222 is received by the eyepiece assembly 209.

Returning to FIG. 2B, in effect, a viewer perceives a composite image at the eyepiece assembly 209 that appears to have visual data from display 212 superimposed over optical data received from the forward optical assembly 204. The optical merging assembly 215 accepts visual images from the display 212 and projects it onto the inner surface 217 (where wedge 216a and 216b are coupled together) of the optical merging assembly 215 through wedge 216b.

In some implementations, a two-way-type reflective coating (not illustrated) can be configured at the inner surface 217 (e.g., a coating on the surface of the wedge 216a adjacent to the surface of the wedge 216b, a separate reflective layer between the two wedges, configured as part of an adhesive layer, and the like as would be understood by those of ordinary skill in the art) to prevent visual data from display 212 from reflecting toward the forward optical assembly 204 through wedge 216a or transmitting through wedge 216a. The reflective coating can be used to guide/reflect the visual images from the display 212 (along with optical data received from forward optical assembly 204 received through wedge 216a) toward the eyepiece assembly 209. Reflecting visual images from the display 212 toward the eyepiece assembly 209 can increase the perceived brightness of the final superimposed image as all (or at least a substantial portion) of the light making up the visual images will not be permitted to transmit through the wedge 216a (e.g., refer to FIG. 2C, light 220).

In another possible implementation, the reflective coating can be used to prevent light from the forward optical assembly 204 from reflecting (and being discarded) at a ninety-degree angle (light 220) at the junction of the two wedge-shaped components (216a & 216b). Here, the reflective coating on the surface of the wedge-shaped component 216a can allow the light from the forward optical assembly 204 to pass through the coating, and once reflected at a ninety-degree angle (e.g., as a normal element of light 220 from adhesive, etc. at the junction of the two wedge-shaped components (216a & 216b)), being subsequently reflected by the reflective coating toward the eyepiece assembly 209.

In typical implementations, optical data from the forward optical assembly 204 passes through wedge 216a of the optical merging assembly 215 at a substantially perpendicular angle to the visual images received from the display 212 through wedge 216b. In some implementations, the wedges are configured to only allow light to travel in a single direction (e.g., prevented from traversing "backwards" through either wedge 216a or wedge 216b) by a polarization or one-way transmission nature of the material of the particular wedge. For example, in some implementations, one or more of wedges 216a/216b could be, or could be coupled with, a photonic crystal (powered or not) to effect one-way light transmission functionality as previously described. Other possible methods of restricting light flow in a single direction will be understood by those of ordinary skill in the art and are considered to be within the scope of this disclosure in various other implementations.

Variations of the optical merging assembly 215 (e.g., type, shape, configuration, materials, orientation, size, etc. of the included optical components) can be used depending upon, for example, light conditions, light filtering desired, size of the optical device 102, etc. In some implementations, the optical merging assembly 215 can include an optical splitter following the optical merging assembly 215 to permit the described superimposed image to be split and sent to both the eyepiece assembly 209 and to a camera (not illustrated) for monitoring/recording purposes. In other implementations, other components consistent with this disclosure can also be included as part of the described optical merging assembly 215.

As can be seen, the display 212, lens 214, and optical merging assembly 215 are coupled/fixed to the movable optical assembly 202 to ensure that precise adjustments can be made by mechanically adjusting the movable optical assembly 202. If movement of the projected digital data is desired (e.g., projected elevation/windage data and a digital reticle), it can also be moved using the multi-function adjustment assembly 106 as described above.

Figure 3:
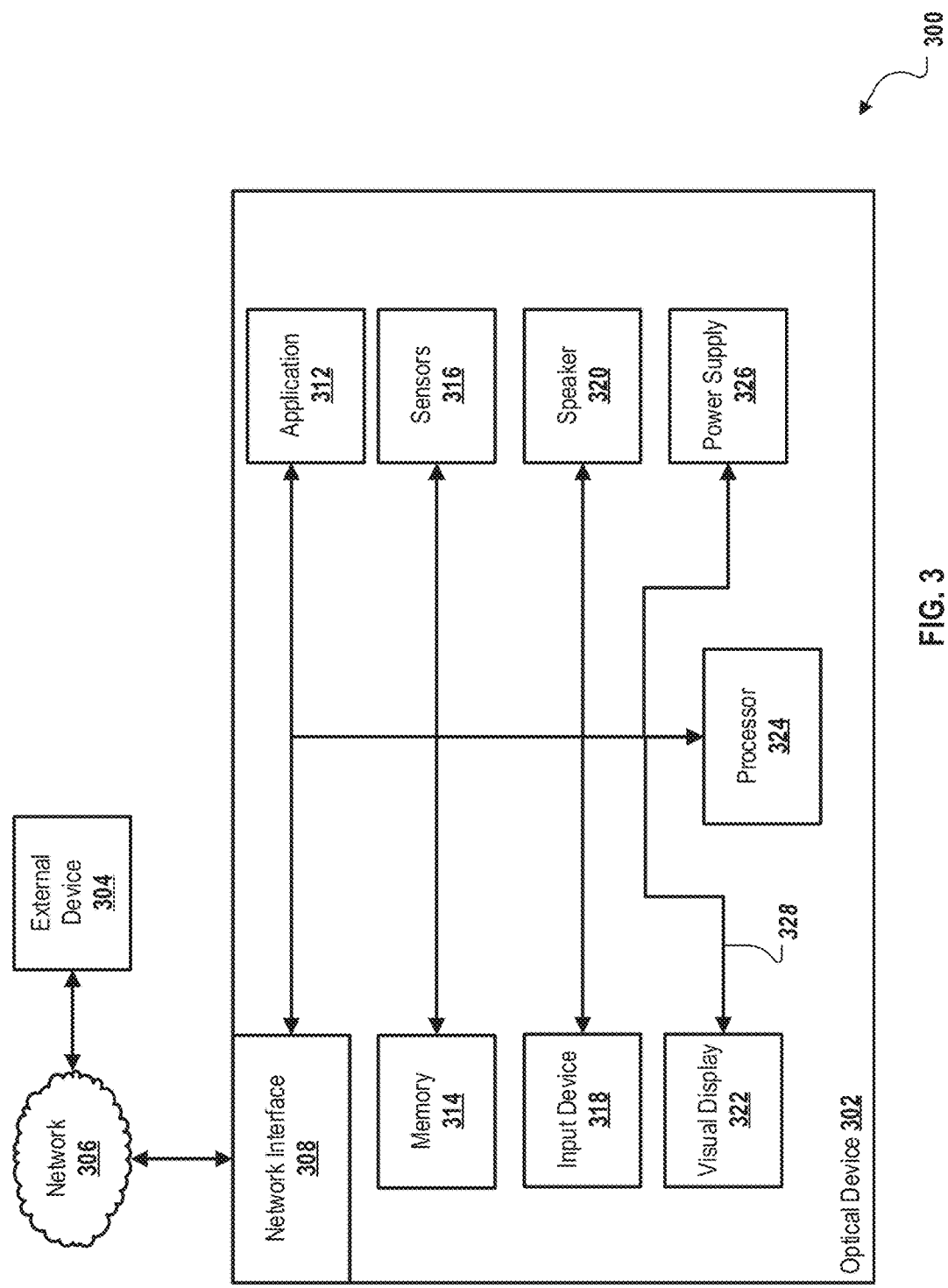
FIG. 3 is a block diagram of computer-related aspects of a daylight optical device system providing precision adjustment of projected digital information, according to an implementation.

FIG. 3 is a block diagram of computer-related aspects of a daylight optical device system 300 providing precision adjustment of projected digital information, according to an implementation. In typical implementations, system 300 includes an optical device 302 and an optional external device 304 coupled together by a network 306. Note that the described optical device 302 is an optical device with a substantial portion of the above-described functionality integrated into the optical device 302. Also, while the following description is generally consistent with above-described optical device 102, FIG. 3, with respect to some implementations of optical device 102, provides additional and/or low-level details of components/functionality not described with respect to FIGS. 1A-1E and 2A-2B. In some instances, FIG. 3 can also be considered a separate implementation of an optical device consistent with this disclosure.

In some implementations, optical device 302 includes a network interface 308, external connector 210 (not illustrated), application 312, memory 314, sensors 316, input device 318, speaker 320, display 322, processor 324, and power supply 326 communicating across a system bus 328. Note that while the system 300 is illustrated in a particular example configuration in FIGS. 1A-1E and 2A-2B, the functionality described in this disclosure is not limited by the illustrated implementation. As will be apparent to those of ordinary skill in the art, there are many possible configurations of system 300 consistent with this disclosure and both the above and following descriptions. Other configurations consistent with this disclosure are considered to be within the scope of this disclosure. For example, in other implementations, the system 300 can contain more or fewer components and/or the communicative coupling can be provided by more than one system bus 328.

Although illustrated as a single network interface 308 in FIG. 3, two or more network interfaces 308 may be used according to particular needs, desires, or particular implementations of the optical device 302/system 300. The network interface 308 is used by the optical device 302 for communicating with other systems (whether illustrated or not) in a distributed environment—including within the system 300—connected to the network 306. Generally, the network interface 308 comprises logic encoded in software and/or hardware in a suitable combination and operable to communicate with the network 306. More specifically, the network interface 308 may comprise software supporting one or more communication protocols associated with communications such that the network 306 or interface's hardware is operable to communicate physical signals within and outside of the illustrated optical device 302/system 300.

External connector 310 represents and can be configured as one or more of a removable memory (e.g., flash memory, etc.) interface to allow the use of removable memory (not illustrated), a power supply connector, data transfer interface (e.g., a USB, FIREWIRE, ETHERNET, RCA, 3.5 mm audio, HDMI, or component), and/or other types of external connectors 310 consistent with this disclosure. Two or more external connectors 310 may be used according to particular needs, desires, or particular implementations of the optical device 302 and/or system 300.

Application 312 is an algorithmic software engine providing functionality according to particular needs, desires, or particular implementations of the optical device 302 and/or performing any required functionality associated with the system 300 and within the scope of this disclosure. For example, application 312 can provide functionality for one or more elements of the optical device 102 described with respect to FIGS. 1A-1E and 2A-2B. An example of this functionality can include projecting digital information onto the above-described display 212 and/or allowing modification, change, etc. to the digital information using the multi-function adjustment assembly 106.

The application 312 can, in some implementations, perform functions for processing received sensor and other data. For example, application 312 can take a received windage, temperature, atmospheric pressure, and audio data set, process the received data set, select/manage instructions for a particular visual representation of digital information to be projected into optical merging assembly 215 using display 212, and/or other functions consistent with this disclosure.

In some implementations, application 312 can also provide optical device 302 functionality for two-way communication between the optical device 302 and an external device 304 (e.g., a mobile computing device executing an associated application, a data storage device, and the like). Further, although illustrated as a single application 312, the application 312 may be implemented as multiple applications 312 on the optical device 302. In addition, although illustrated as integral to the optical device 302, in alternative implementations, the application 312 can be external to the optical device 302 and/or the system 300.

Memory 314 holds data for the optical device 302 and/or the one or more elements of the system 300 and represents both internal- and external (removable)-type memory that can be used with the optical device 302 and consistent with this disclosure. For example, internal-type memory can include one or more of flash, LPDDR2, and the like. External (removable)-type memory can include, for example, USB-type memory, CF cards, SD cards, and the like. Although illustrated as a single memory 314 in FIG. 3, two or more memories 314 may be used according to particular needs, desires, or particular implementations of the optical device 302 and/or system 300.

Sensors 316 can include one or more of visual, audio, temperature, altitude, humidity, atmospheric pressure, elevation, gyroscopic, accelerometer, light intensity, compass, and/or other sensors consistent with this disclosure. In some implementations, one or more of the sensors 316 can include metadata (e.g., time, date, geographic location, time span, security data, observer identification, subject identification, and the like) with gathered applicable data. In alternative implementations, one or more sensors 316 can be external to the optical device 302 (e.g., an externally attached camera, microphone, etc.).

A visual sensor (not illustrated) typically includes one or more of still/motion daylight, IR, ultraviolet (UV), or other spectrum cameras. In typical implementations, the visual sensor is designed to collect visible/non-visible light to allow processing, for example, by the application 312 and processor 324 for display on the display 322 or to be projected into the optical device 302 optical path. For example, in some implementations, the visual sensor can be a LEPTON brand thermal imager visual sensor such as that produced by FLIR, Inc. (or equivalent type of visual sensor). In some implementations, both an IR thermal image displayed on display 212 and daylight optical data from the forward optical assembly 204 can be merged using the optical merging assembly 215 to produce a more useful image for an observer and/or to permit analysis of the separate visual sensor image (e.g., by the application 312) and for additional digital information to be projected into the optical path of the optical device 302.

In some implementations, audio (e.g., gathered from one or more audio sensors (e.g., a microphone—not independently illustrated)) can be added to images gathered and recorded from a visual sensor, independent device added to the eyepiece 209, and/or an integrated camera monitoring merged visual data in the optical path of the optical device 302 (as described above using a separate optical splitter or similar methods to capture visual data). The audio can provide additional useful data when coupled with recorded visual data.

Input device 318 can include a built-in keyboard, keypad, touch-sensitive display, verbal command recognition (e.g., using the a microphone and/or an external device such as a smart phone or smart watch connected/paired to the optical device 302 to gather voice data for command recognition), and the like. In some implementations, input device 318 can be an externally connected input device (e.g., a smart computing device, a connected keyboard, etc.). In some implementations, desired functionality may need to be entered using more than one input device 318. In some implementations, input device 318 can be or include multi-function adjustment assembly 106.

Speaker 320 provides audio output functionality. In some implementations, the speaker 320 can include externally connected (e.g., using external connector 310) speakers 320 to provide better audio input/output resolution.

Visual display 322 (e.g., an LCD, OLED, AMOLED, or other suitable display) is used to provide both visual indications and data to an observer and, in some implementations, to accept user input (e.g., using a touch-sensitive display). For example, the visual display 322 can be built into the external casing of optical device 302 and can display visual images (including the merged optical/projected digital information described above for external monitoring alignment of the optical device 302), provide a GUI for control, settings, etc., display processed data in graphical form (e.g., in charts/graphs), and other functionality consistent with this disclosure.

Generally, the processor 324 executes instructions and manipulates data to perform the above-described operations performed by the optical device 302. Specifically, the processor 224 can execute the functionality for creating, operating, and/or managing an optical device 302 and/or system 300 (or any element of the system 300) and/or performing any functionality associated with the system 300 and within the scope of this disclosure. Although illustrated as a single processor 324 in FIG. 3, two or more processors 324 may be used according to particular needs, desires, or particular implementations of the optical device 302 and/or the system 300. In some implementations, the processor can be configured as a system-on-a-chip (SoC), system-in-parts (SiP), or other configuration (e.g., including a memory controller, processor, graphics processor, memory, memory interface, network interface, and the like in a single or tightly-integrated package). In these implementations, various described elements of the optical device 302 can be incorporated into and performed by the processor 324.

Power supply 326 can include AC/DC, battery, rechargeable battery, and/or other power sources used to operate the optical device 302. Power supply 326 is typically interfaced with at least one form of power switch (such as multi-function adjustment assembly 106) to turn the device ON/OFF (e.g., button, toggle, touch-sensitive, voice control, etc.). In some implementations, the optical device 302 provides functionality to analyze and inform a user of the charge/recharge status of batteries. In some configurations, rechargeable batteries can either be user- or non-user-replaceable.

In some implementations, the optical device 302 can be configured to permit modular addition/removal of components from the optical device 302. For example, an optical device 302 can be configured with standard components (e.g., memory 314, application 312, input device 318, processor 324, etc.), but other elements of the optical device 302 can be modularly added and removed from the optical device 302 (e.g., sensors 316 such as visual or audio sensors can be replaced for better resolution/different spectrum images or directional audio gathering, a stereo speaker 320 for better audio output resolution, an enhanced power supply 324, stronger forward optical assembly 204, etc.).

In some implementations, elements of optical device 302 (and similarly other elements of system 300) can be updated using various methods. For example, in some implementations, updated firmware, application, and/or reticle data can be introduced to optical device 302 through the external connector 310, network interface 308, and/or memory 314. In these implementations, data can be transferred using a USB memory device, data cable (USB, FIREWIRE, etc.), network cable (e.g., ETHERNET, etc.), and/or other transfer method consistent with this disclosure. In some implementations, the optical device 310 can be updated using a wireless type connection (e.g., WIFI, BLUETOOTH, cellular, etc.).

Figure 4:
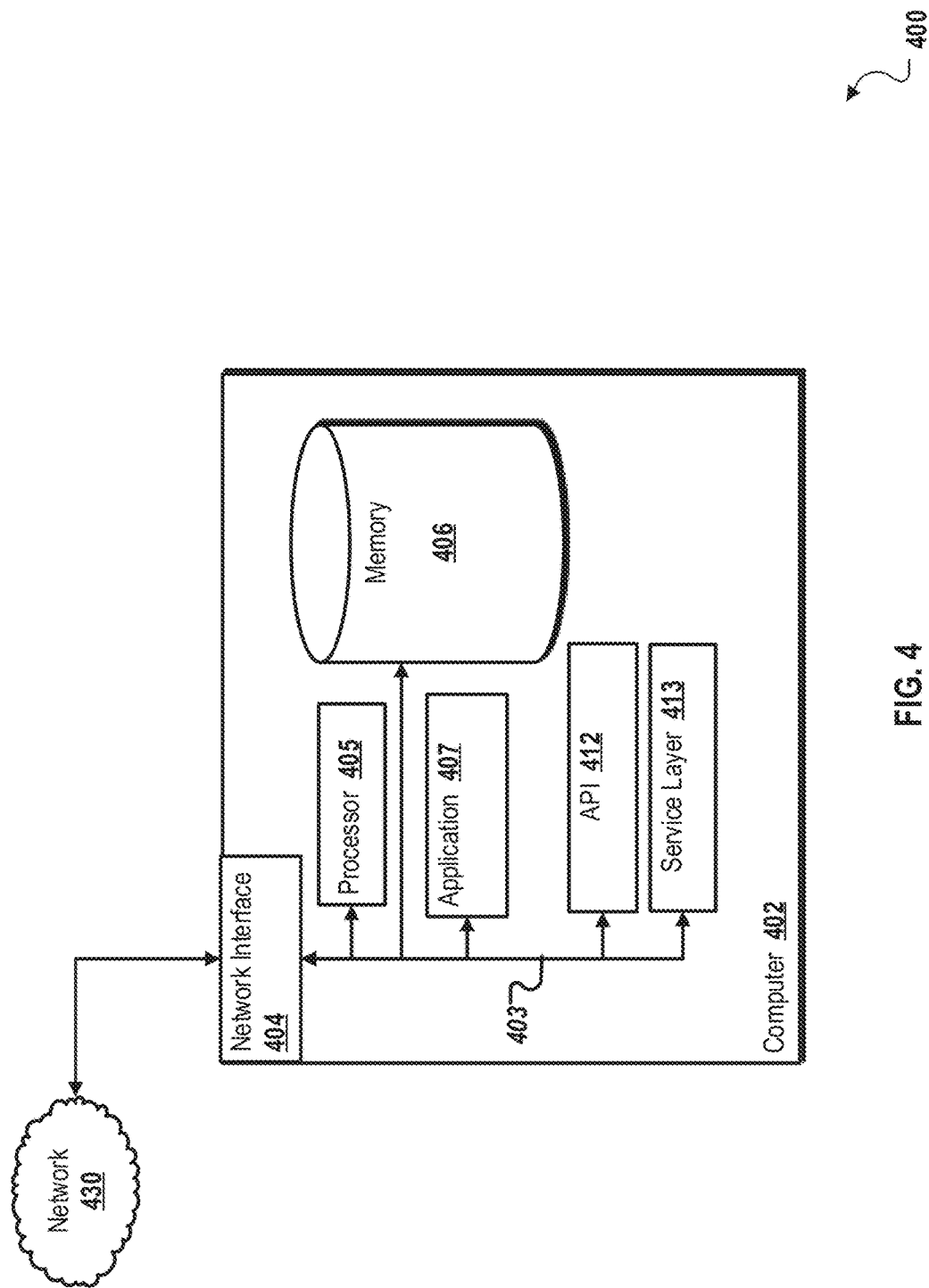
FIG. 4 is a block diagram of an exemplary computer used in providing precision adjustment of projected digital information in a daylight optical device, according to an implementation.

FIG. 4 is a block diagram 400 of an exemplary computer 402 used in providing precision adjustment of projected digital information in a daylight optical device, according to an implementation. The illustrated computer 402 is intended to encompass any computing device integrated with and/or coupled to an optical device as described in this disclosure—such as a server, desktop computer, laptop/notebook computer, wireless data port, smart phone, personal data assistant (PDA), tablet computing device, wearable computer, smart watch, television, one or more processors within these devices, or any other suitable processing device, including both physical and/or virtual instances of the computing device. Additionally, the computer 402 may include an input device, such as a keypad, keyboard, touch screen, multi-function button(s), and/or other device that can accept user information, and an output device that conveys information associated with the operation of the computer 402, including digital information, visual and/or audio information, or a GUI.

While the computer 402 typically serves as part of and/or in conjunction with an optical device 302 and/or external device 304, in some implementations, the computer 402 can also serve as a client, network component, a server, a database or other persistency, and/or any other component (whether or not illustrated) of the system 300 described with respect to FIG. 3. The illustrated computer 402 is communicably coupled with a network 430 (e.g., network 306 of FIG. 3). In some implementations, one or more components of the computer 402 may be configured to operate within a cloud-computing-based environment.

At a high level, the computer 402 is an electronic computing device operable to receive, transmit, process, store, or manage data and information associated with the system 300. In some implementations, the computer 402 may also include or be communicably coupled with an application server, e-mail server, web server, caching server, streaming data server, and/or other server.

The computer 402 can receive requests over network 430 from an application (e.g., an application 407 executing on another computer 402 or another application) or other element of system 300 and responding to the received requests by processing the said requests in an application (e.g., application 407). In addition, requests may also be sent to the computer 402 from internal users (e.g., from a command console or by other appropriate access method), external or third parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the network interface 404 over the system bus 403 using an application programming interface (API) 412 and/or a service layer 413. The API 412 may include specifications for routines, data structures, and object classes. The API 412 may be either computer language-dependent/independent and refer to a complete interface, a single function, or even a set of APIs. The service layer 413 provides software services to the computer 402 and/or the system 300. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or system 300. Moreover, any or all parts of the API 412 and/or the service layer 413 may be implemented as child or sub-modules of another software module, application, or hardware module without departing from the scope of this disclosure.

The computer 402 includes a network interface 404 (e.g., network interface 308). Although illustrated as a single network interface 404 in FIG. 4, two or more network interfaces 404 may be used according to particular needs, desires, or particular implementations of the computer 402 and/or system 300. The network interface 404 is used by the computer 402 for communicating with other systems (whether illustrated or not) in a distributed environment—including within the system 300—connected to the network 430. Generally, the network interface 404 comprises logic encoded in software and/or hardware in a suitable combination and operable to communicate with the network 430. More specifically, the network interface 404 may comprise software supporting one or more communication protocols associated with communications such that the network 430 or interface's hardware is operable to communicate physical signals within and outside of the illustrated system 300.

The computer 402 includes a processor 405 (e.g., processor 324). Although illustrated as a single processor 405 in FIG. 4, two or more processors may be used according to particular needs, desires, or particular implementations of the computer 402 and/or the system 300. Generally, the processor 405 executes instructions and manipulates data to perform the operations of the computer 402. Specifically, the processor 405 can execute the functionality for creating, operating, and/or managing a system 300 (or any element of the system 300) and/or performing any functionality associated with the system 300 and within the scope of this disclosure—particularly providing precision adjustment of projected digital information within a daylight optical device 302.

The computer 402 also includes a memory 406 (e.g., memory 314) that holds data for the computer 402 and/or other components of the system 300. Although illustrated as a single memory 406 in FIG. 4, two or more memories may be used according to particular needs, desires, or particular implementations of the computer 402 and/or the system 300. While memory 406 is illustrated as an integral component of the computer 402, in alternative implementations, memory 406 can be external to the computer 402 and/or the system 300.

The application 407 (e.g., application 312) is an algorithmic software engine providing functionality according to particular needs, desires, or particular implementations of the computer 402, particularly with respect to functionality required for creating, operating, and/or managing a system 300 (or any element of the system 300) and/or performing any functionality associated with the system 300 and within the scope if this disclosure—particularly providing precision adjustment of projected digital information within a daylight optical device 302. For example, application 407 can provide functionality for one or more components, modules, applications, etc. described with respect to FIGS. 1A-1E, 2A-2B, and 3. Further, although illustrated as a single application 407, the application 407 may be implemented as multiple applications 407 on the computer 402. In addition, although illustrated as integral to the computer 402, in alternative implementations, the application 407 can be external to the computer 402 and/or the system 300. There may be any number of computers 402 associated with, or external to, the system 300 and communicating over network 430. Further, the terms "client," "user," and other appropriate terminology may be used interchangeably as appropriate without departing from the scope of this disclosure. Moreover, this disclosure contemplates that many users may use one computer 402, or that one user may use multiple computers 402.

Figure 5:
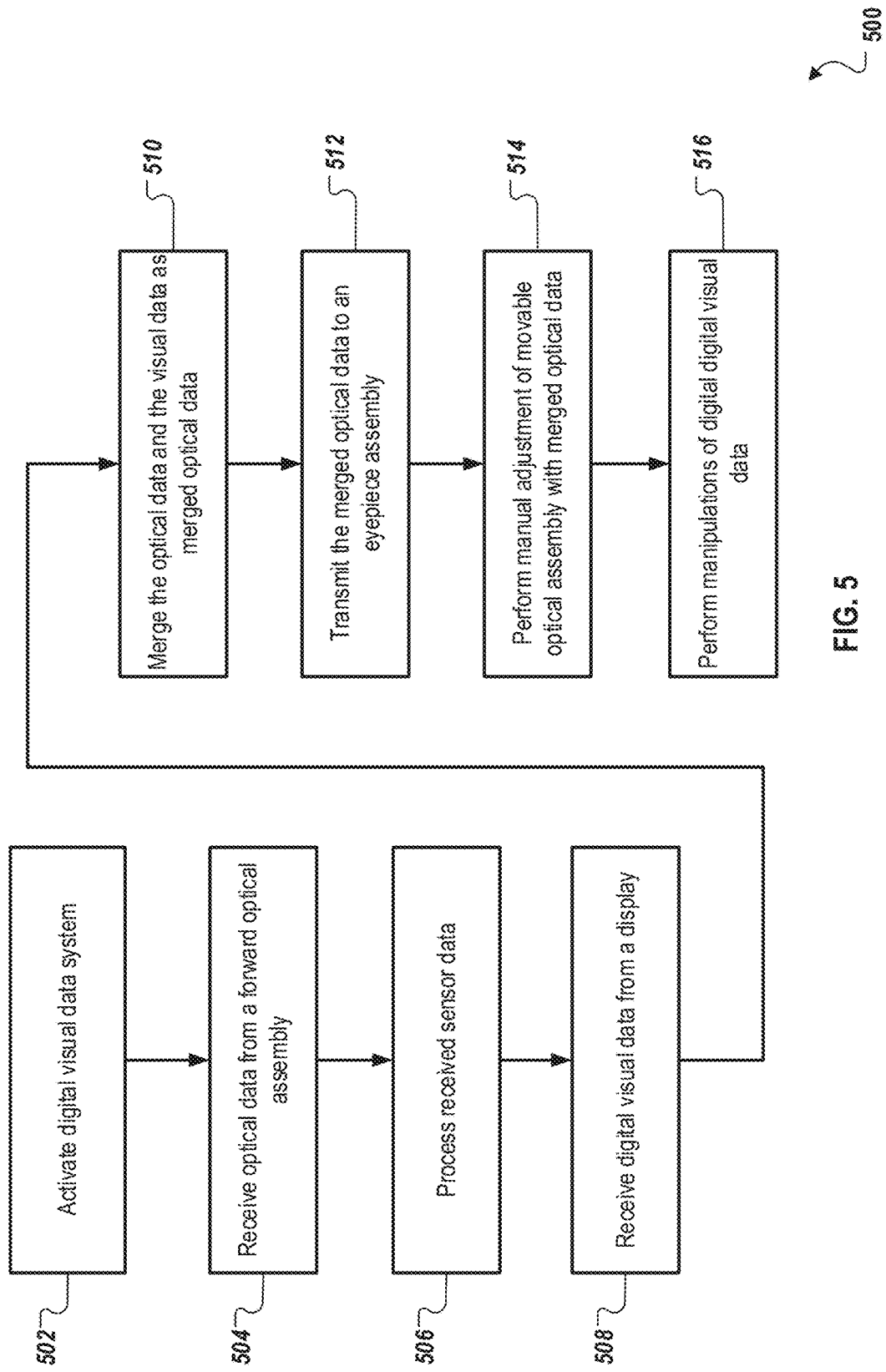
FIG. 5 is a flow chart of a method for providing precision adjustment of projected digital information in a daylight optical device, according to an implementation.

FIG. 5 is a flow chart of a method 500 for providing precision adjustment of projected digital information in a daylight optical device, according to an implementation. For clarity of presentation, the description that follows generally describes method 500 in the context of FIGS. 1A-1E, 2A-2B, and 3-4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

At 502, a digital visual data system associate with an optical device is activated. In some implementations, the activation can be performed using a multi-function adjustment assembly, a computing device interoperably coupled with the optical device, etc. From 502, method 500 proceeds to 504.

At 504, optical data is received from a forward optical assembly. For example, the optical data can be the light received from the front-facing optics of a firearm scope. The optical data is received at one or more components of an optical merging assembly. From 504, method 500 proceeds to 506.

At 506, received sensor data is processed for one or more sensors associated with the digital visual data system. For example, data associated with visual, audio, temperature, altitude, humidity, atmospheric pressure, elevation, gyroscopic, accelerometer, light intensity, compass, and/or other sensors (either physically associated with the optical device (e.g., built-in to the optical device casing) or interoperably coupled with the optical device (e.g., linked with a hard wire, WIFI, etc.) optical merging assembly 215) consistent with this disclosure can be received and processed for display on a micro display associated an the optical merging assembly. From 506, method 500 proceeds to 508.

At 508, digital visual data is received at the optical merging assembly from the display. From 508, method 500 proceeds to 510.

At 510, the optical data and digital visual data is merged by the optical merging assembly. To a viewer, it appears as if the digital visual data has been superimposed onto the optical data received from the forward optical assembly. From 510, method 500 proceeds to 512.

At 512, the merged optical data and digital visual data is transmitted to an eyepiece assembly for viewing by the viewer. From 512, method 500 proceeds to 514.

At 514, a movable optical assembly (coupled with the optical merging assembly) is manually adjusted (e.g., elevation and windage). The manual adjustments permit gradation adjustments as fine as provided by the manual adjustment capabilities of the optical device without being limited to a minimum of pixel-sized gradations due to display pixel size. From 514, method 500 proceeds to 516.

At 516, manipulation of the digital visual data is performed (e.g., using the multi-function adjustment assembly). The manipulations can, for example, move the digital visual data in relation to the viewed optical data from the forward optical assembly as viewed by a viewer, turn OFF one or more elements of the digital visual data, change aspects (e.g., color, size, etc.) of one or more elements of the digital visual data, etc. The importance of this ability is that the optical components of the optical device can, in some implementations, be manually locked for stability, and the digital visual data then adjusted in relation to the locked optical components. After 516, method 500 stops.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method comprising:
receiving optical data from a forward optical assembly of the optical device at an optical merging assembly mechanically coupled to a movable optical assembly independently movable in relation to the forward optical assembly;
receiving digital visual data from a digital micro display at the optical merging assembly though a lens coupled to and between a component of the optical merging assembly and the digital micro display, the lens configured to focus the digital visual data within the optical merging assembly to an image size based on a difference in size between the digital micro display and the component of the optical merging assembly;
transmitting merged received optical data and digital visual data to an eyepiece assembly for viewing; and
manually adjusting a movable optical assembly containing the optical merging assembly in relation to the received optical data from the forward optical assembly.

2. The method of claim 1, wherein the optical merging assembly comprises a plurality of wedge-shaped optical components.

3. The method of claim 1, wherein received sensor data is processed for one or more sensors associated with the digital visual data.

4. The method of claim 3, wherein processing includes formatting, sizing, scaling, position determination, contrast determination, and brightness determination.

5. The method of claim 1, wherein the digital visual data is generated on the digital micro display coupled with the component of the optical merging assembly.

6. The method of claim 1, comprising locking the manual adjustment of the movable optical assembly.

7. The method of claim 6, comprising manipulating one or more aspects of the digital visual data in relation to the locked movable optical assembly.

8. A non-transitory, computer-readable medium storing computer-readable instructions, the instructions executable by a computer and configured to
transmit digital visual data from a digital micro display to an optical merging assembly though a lens coupled to and between a component of the optical merging assembly and to the digital micro display, the lens configured to focus the digital visual data within the optical merging assembly to an image size based on a difference in size between the digital micro display and the component of the optical merging assembly, the optical merging assembly mechanically coupled to a movable optical assembly that is independently movable in relation to a forward optical assembly, the digital visual data reflected by the optical merging assembly to be received at an eyepiece assembly along with optical data received by the forward optical assembly and transmitted through the optical merging assembly.

9. The non-transitory, computer-readable medium of claim 8, wherein the optical merging assembly comprises a plurality of wedge-shaped optical components.

10. The non-transitory, computer-readable medium of claim 8, comprising processing received sensor data for one or more sensors associated with the digital visual data.

11. The non-transitory, computer-readable medium of claim 10, wherein processing includes formatting, sizing, scaling, position determination, contrast determination, and brightness determination.

12. The non-transitory, computer-readable medium of claim 8, wherein the digital visual data is generated on the digital micro display coupled with the component of the optical merging assembly.

13. The non-transitory, computer-readable medium of claim 8, comprising locking a manual adjustment of the movable optical assembly.

14. The non-transitory, computer-readable medium of claim 13, comprising manipulating one or more aspects of the digital visual data in relation to the locked movable optical assembly.

15. An optical device, comprising:
a forward optical assembly; and
an elevation manual adjustment and a windage manual adjustment configured to adjust a position of a movable optical assembly, the movable optical assembly containing an optical merging assembly moveable in relation to the forward optical assembly, the optical merging assembly comprising:
a first wedge-shaped component receiving optical data from the forward optical assembly; and
a second wedge-shaped component adjacent to the first wedge-shaped component, the second wedge-shaped component receiving and transmitting the optical data from the first wedge-shaped component toward an eyepiece assembly and reflecting digital visual data from a digital micro display toward the eyepiece assembly to present a merged data view when viewed through the eyepiece assembly, the digital visual data received by the second wedge-shaped component though a lens coupled to and between the second wedge-shaped component and to the digital micro display, the lens configured to focus the digital visual data within the optical merging assembly to an image size based on a difference in size between the digital micro display and the component of the optical merging assembly.

16. The optical device of claim 15, wherein the position of the digital visual data on the digital micro-display is adjustable.

17. The optical device of claim 16, wherein the movable optical assembly is adjustable using one or more of the elevation manual adjustment and the windage manual adjustment independently of a positional adjustment of the digital visual data on the digital micro-display.

18. The optical device of claim 15, wherein each wedge-shaped optical component is configured to allow light to travel in a single direction through the wedge-shaped optical component.

19. The optical device of claim 15, comprising a two-way reflective coating between the first wedge-shaped component and the second wedge-shaped component, the two-way reflective coating configured to reflect visual data in the direction of the eyepiece assembly.

20. The optical device of claim 16, wherein adjusting the position of the digital visual data on the digital micro-display changes a position of the digital visual data within the optical merging assembly.

* * * * *